(12) United States Patent
Iourcha

(10) Patent No.: US 6,373,496 B1
(45) Date of Patent: Apr. 16, 2002

(54) APPARATUS AND METHOD FOR TEXTURE MAPPING

(75) Inventor: Konstantine Iourcha, San Jose, CA (US)

(73) Assignee: S3 Graphics Co., Ltd., Cayman Islands (KN)

( * ) Notice: Subject to any disclaimer, the term of this patent is extended or adjusted under 35 U.S.C. 154(b) by 0 days.

(21) Appl. No.: 09/373,914

(22) Filed: Aug. 12, 1999

Related U.S. Application Data

(60) Provisional application No. 60/096,324, filed on Aug. 12, 1998.

(51) Int. Cl.[7] .............................................. G06T 11/40
(52) U.S. Cl. ..................................................... 345/587
(58) Field of Search ................................. 345/430, 587

(56) References Cited

U.S. PATENT DOCUMENTS

| | | | |
|---|---|---|---|
| 4,615,013 A | | 9/1986 | Yan et al. |
| 5,097,427 A | * | 3/1992 | Lathrop et al. |
| 5,222,205 A | * | 6/1993 | Larson et al. |
| 5,606,650 A | | 2/1997 | Kelley et al. |
| 6,005,582 A | * | 12/1999 | Gabriel et al. |

OTHER PUBLICATIONS

Williams, Lance. "Pyramidal Parametrics", Proceedings of SIGGRAPH '83, Computer Graphics, vol. 17, No. 3, Jul. 1983, pp. 1–11.

* cited by examiner

*Primary Examiner*—Jeffery Brier
(74) *Attorney, Agent, or Firm*—Carr & Ferrell LLP

(57) ABSTRACT

An apparatus method is provided for mipmapping a texel to a pixel to computer graphics objects on a display for a graphics computer system. The rendering speed is increased by determining the texture coordinates and the mipmap level of detail of the mipmap in parallel. The texture coordinate and mipmap level of detail constants are calculated in parallel for an object primitive and pixels are selected in the primitive. The pixels are rendered based on parallel texture coordinate and mipmap level of detail calculations using the previously calculated texture coordinate and mipmap level of detail constants.

25 Claims, 4 Drawing Sheets

US 6,373,496 B1

APPARATUS AND METHOD FOR TEXTURE MAPPING

CROSS-REFERENCE TO RELATED APPLICATION

This application claims the benefit of U.S. Provisional Patent Application No. 60/096,324, filed on Aug. 12, 1998, which is incorporated herein by reference thereto.

TECHNICAL FIELD

The present invention relates generally to texture mapping in graphics systems, and particularly to an apparatus and method of calculating a mipmap level of detail in parallel with texture mapping.

BACKGROUND ART

Texture mapping is a powerful technique for adding realism to a computer-generated scene. In its basic form, texture mapping lays an image (the texture) onto an object in a scene.

Because texture mapping is so useful, it is being provided as a standard rendering technique both in graphics software interfaces and in computer graphics hardware. The wide availability and high-performance of texture mapping makes it a desirable rendering technique for achieving a large number of special effects.

When mapping an image onto an object, the color of the object at each picture element, or pixel, is modified by a corresponding color from the image. In general, obtaining this color from the image conceptually requires several steps. The image is normally stored as a sample array, so a continuous image must first be reconstructed from the samples. Next, the image must be warped to match any distortion (such as caused by perspective) in the projected object being displayed. Then this warped image is filtered to remove high-frequency components that would lead to aliasing in the final step and resampled to obtain the resulting color to apply to the pixel being textured.

In practice, the required pre-filtering is approximated by one of the several methods. One of the most popular is mipmapping (from MIP, multium in pravo, many things in a small space). See L. Williams, "Pyramidal Parametrics", Proceedings of SIGGRAPH '83, Computer Graphics, vol. 17, no. 3, July 1983, pp. 1–11.

In basic texture mapping, an image is applied to a polygon, such as a triangle (which is called a "primitive"), by assigning texture coordinates to the polygon's vertices. These coordinates index a texture image, and are interpolated across the polygon to determine, at each of the polygon's pixels, a texture image value. The result is that some portion of the texture image is mapped onto the polygon when the polygon is viewed on the screen.

The pixel locations in the screen space are given by X and Y coordinates, and a polygon is rendered based on the geometry of the polygon, the translation, distortion, and rotation of the polygon in the scene being rendered, lighting conditions and information about the appearance of the polygon.

Information about the appearance of the polygon in particular is defined by a texture map with orthogonal indices U and V for the texture space coordinates. The texture image is made up of texture elements, or "texels," which are analogous to the pixels of the image being rendered to the screen space. The image is mapped to the polygon such that the polygon appears to have the texture image attached to it, like wallpaper on a wall. The values which make up texture maps will also be referred to as texels.

As a polygon is warped, the texture information attached to the polygon is also changed. Because the area of a texture map changes, the size of a single pixel of screen space in texture space varies as the polygon moves in the scene so it is conventional to use textures of varying mipmap levels of detail in place of a single texture map, or mipmap. This allows the mapping of screen space pixels to texture map texels to be carried out efficiently, by using a texture map which has texels of approximately the same size as the area corresponding to a single pixel. In typical mipmaps, a hierarchy of maps is constructed, based on one full resolution map. The full resolution map constitutes the lowest mipmap level map. Each higher mipmap level contains a map in which the texels each represent a 2×2 texel region in the map one mipmap level lower. The highest mipmap level map typically contains only one texel.

In order to use mipmapping, a real-time graphics rendering system must be able to quickly determine the correct mipmap level of detail to use. The mipmap level of detail is generally expressed by the parameter "D". A D value of zero corresponds to the lowest mipmap level, and each higher integer value of D corresponds to a higher mipmap level. For example, a D value of two would correspond to a map two mipmap levels of detail higher than the zero mipmap level. Each texel in the mipmap level two map represents a 4×4 texel region in the mipmap level zero map. In the past, the determination of D had to be carried out for each pixel drawn to the screen space, since each pixel could correspond to a region of the polygon of a different size. By taking the $\log_2$ of the Jacobian norm, the mipmap level of detail (D) is determined wherein the characteristic (integer) is the mipmap level of detail and the mantissa (fraction) is the blending required or $D = \log_2 \|J\|$.

A conventional method of estimating D is to use the larger of:

$$D = \log_2 \left( \sqrt{\left(\frac{dU}{dX}\right)^2 + \left(\frac{dU}{dY}\right)^2} \right) \quad \text{(Equation 1)}$$

or $$D = \log_2 \left( \sqrt{\left(\frac{dV}{dX}\right)^2 + \left(\frac{dV}{dY}\right)^2} \right)$$

where dU/dX represents the partial derivative of U with respect to X. As the polygon is made to cover less space in the screen space, each pixel will cover more texels of the zero mipmap level map, increasing the value of D.

An equivalent method of estimating D is to use the larger of:

$$D = \log_2 \left( \sqrt{\left(\frac{dU}{dX}\right)^2 + \left(\frac{dV}{dX}\right)^2} \right) \quad \text{(Equation 2)}$$

or $$D = \log_2 \left( \sqrt{\left(\frac{dU}{dY}\right)^2 + \left(\frac{dV}{dY}\right)^2} \right)$$

which is based on a different estimation of $\log_2 \|J\|$.

In order to determine the appropriate texture information for a pixel, the rendering system must determine not only the mipmap level of detail, which indicates which map to use, but also the coordinates of the point in the map which coincides with the pixel. Conventionally, the mapping of pixel coordinates (X,Y) to texture coordinates (U,V) is approximated by equations of the form:

$$U = \frac{\tilde{U}}{\tilde{W}}$$
$$V = \frac{\tilde{V}}{\tilde{W}}$$
$$\tilde{W} \overset{det}{=} Z_{screen}$$

(Equation 3-8)

where $a_i$, $b_i$, and $c_i$ (i=1,2,3) are constants which define the relation between the pixel coordinates and the map coordinates. These constants are referred to as the "map coordinate setup constants," because they are calculated once for each polygon (during the "setup" for the polygon) and are then used to calculate the map coordinates U and V given pixels with coordinates of X and Y.

The determination of dU/dX, dU/dY, dV/dX, and dV/dY conventionally is carried out through the use of equations of the form:

$$\frac{dU}{dX} = \frac{a_1}{\tilde{W}} - \frac{\tilde{U} * a_3}{(\tilde{W})^2}$$
$$\frac{dU}{dY} = \frac{b_1}{\tilde{W}} - \frac{\tilde{U} * b_3}{(\tilde{W})^2}$$
$$\frac{dV}{dX} = \frac{a_2}{\tilde{W}} - \frac{\tilde{V} * a_3}{(\tilde{W})^2}$$
$$\frac{dV}{dY} = \frac{b_2}{\tilde{W}} - \frac{\tilde{V} * b_3}{(\tilde{W})^2}$$

(Equation 9-12)

The mipmap level of detail, D, is then calculated using equations of the form of either Equation 1 or Equation 2. After U, V, and D are determined for a given pixel, the necessary texture information from the map of mipmap level D is retrieved from the texel at location U, V.

Thus, in the past, there was a high latency in the rendering of a textured graphic image because of the sequential nature of the necessary calculations. The coordinate setup constants would first have to be calculated, then the values of U, V, and W calculated, and finally the mipmap level of detail, D.

With the importance of speed in order to obtain fast, real-time 3D graphics, a faster system for mipmap texturing has been long sought but has eluded those skilled in the art.

DISCLOSURE OF THE INVENTION

The present invention provides a system and method for mipmapping a texture to a computer graphics object on a display for a graphics computer system. It includes a polygon selection mechanism for selecting a polygon from a plurality of polygons defining the object and a texture coordinate determining mechanism for determining the texture coordinates of the polygon. A mipmap level determining mechanism determines the mipmap level of detail of a mipmap appropriate for the polygon. The mipmap level determining mechanism is operatively connected to the texture coordinate determining mechanism. A polygon rendering mechanism is connected to the texture coordinate determining mechanism and the mipmap level determining mechanism for rendering the textured polygon on the display.

The present invention further provides a system and method of faster mipmap texturing in which the mipmap level of detail determination consists of a mipmap level of detail setup part and a mipmap level of detail pixel-specific part. The mipmap level of detail setup part does not rely on the coordinate setup constants, and may therefore be performed in parallel with the determination of the coordinate setup constants. Because the coordinate setup and the mipmap level of detail setup must both be performed for each polygon rendered, carrying out the two determinations in parallel allows the rendering of every polygon to be completed in less time.

The present invention has the advantage of allowing the determination of the mipmap level of detail, D, in parallel with the determination of the mipmap coordinates U and V as each pixel is rendered.

The present invention further has the advantage of requiring less rendering time for each pixel drawn.

The above and additional advantages of the present invention will become apparent to those skilled in the art from a reading of the following detailed description when taken in conjunction with the accompanying drawings.

BEST MODE FOR CARRYING OUT THE INVENTION

Figure 1:
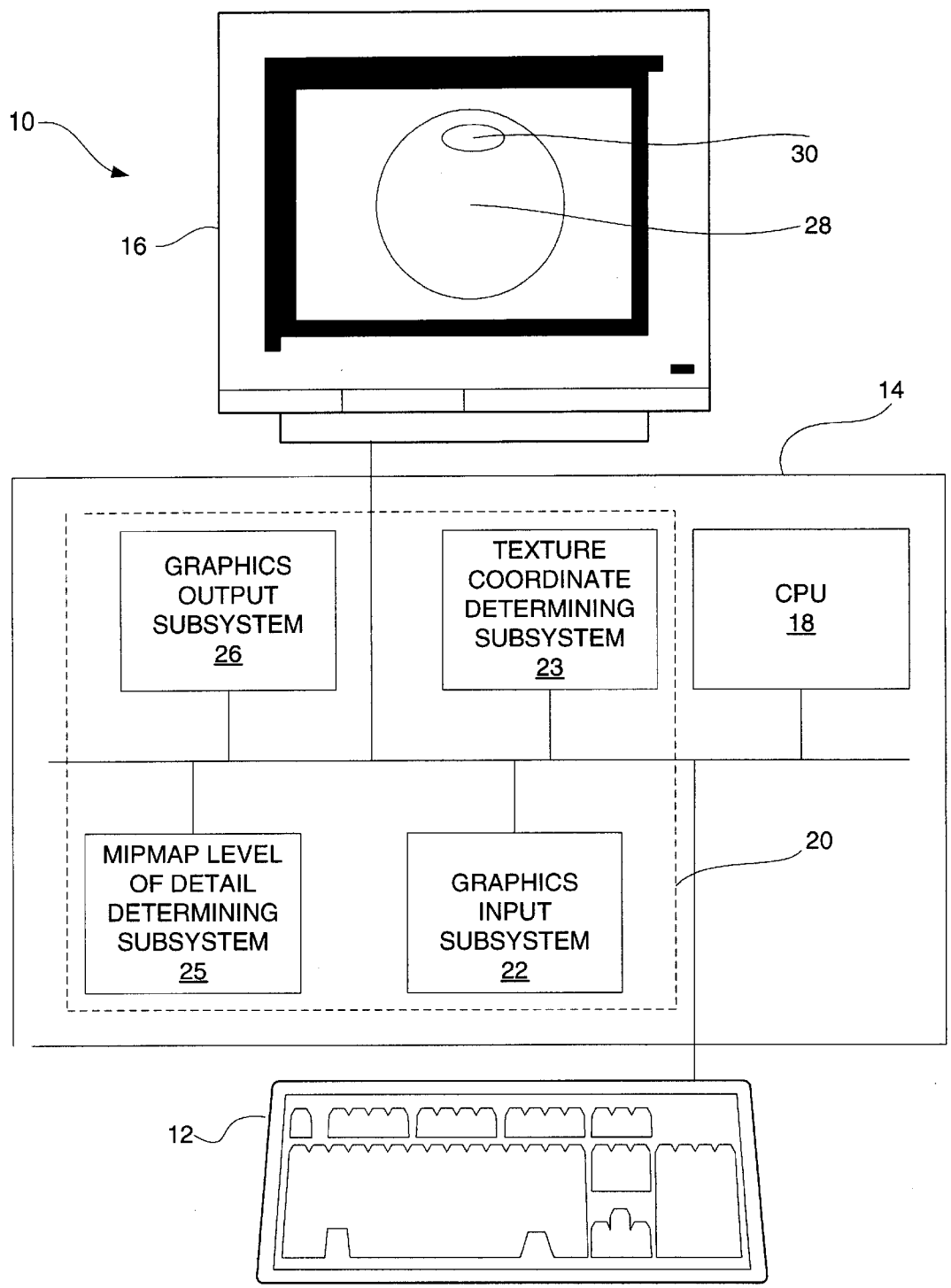
FIG. 1 is a system incorporating the present invention.

Referring now to FIG. 1, therein is shown a computer graphics system 10 consisting of an input keyboard 12, a computer 14, and an output display 16.

The computer 14 contains all the conventional components for operation of the system 10, including a central processing unit (CPU) 18. The CPU 18 is connected to a graphics system 20, which in turn is connected to the output display 16. The graphics system 20 contains a graphics input subsystem 22, a texture coordinate-determining subsystem 23, a mipmap level of detail-determining subsystem 25, and a graphics output subsystem 26.

On the output display 16 is shown an object 28, which is spherical and which has a specular highlight 30 on top.

Figure 2:
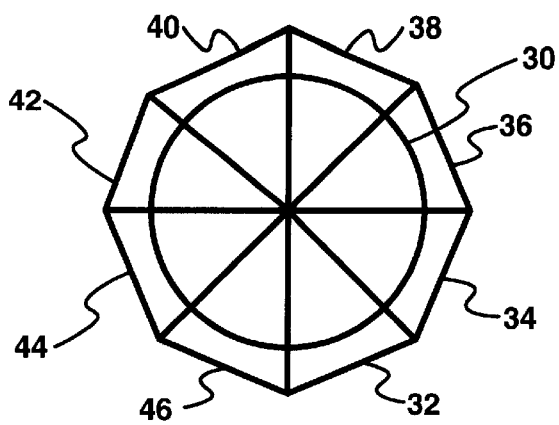
FIG. 2 (PRIOR ART) is an illustration of the polygons making up an object on a display.

Referring now to FIG. 2, therein is shown a partial top view of the object 28 showing a number of polygons which form the surface of the object 28. Specifically, the surface of the object 28 is made up of a plurality of triangles, including triangles 32, 34, 36, 38, 40, 42, 44, and 46. For reference, the specular highlight 30 is shown disposed around the common vertex of the triangles. Each of the pixels which make up the triangles is positioned on the output display 16 pursuant to an X-Y coordinate system with each triangle having vertices at $(x_1, y_1)$, $(x_2, y_2)$, and $(X_3, y_3)$.

Figure 3:
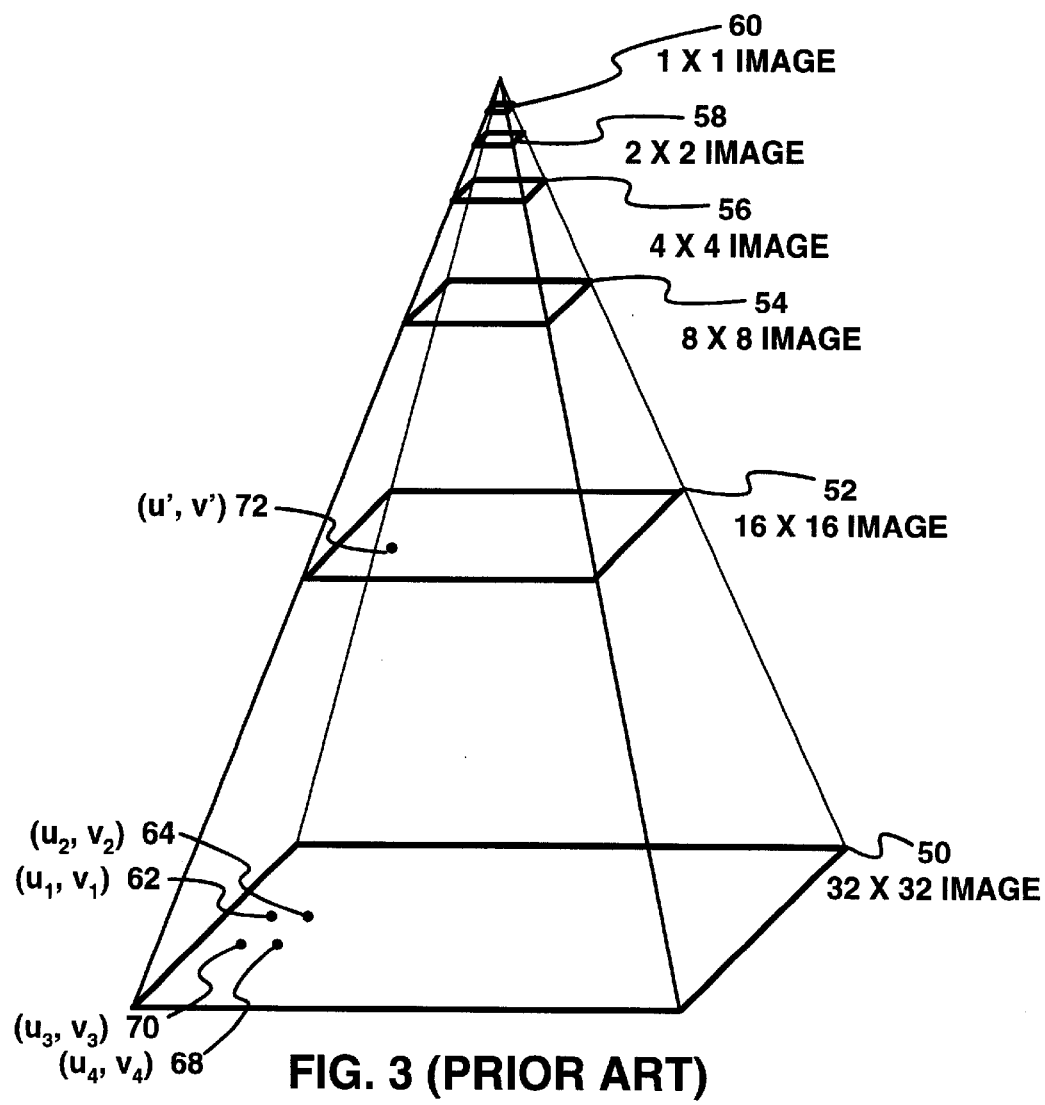
FIG. 3 (PRIOR ART) is an illustration of the mipmap format of texture maps.

Referring now to FIG. 3, therein is shown a mipmap in which a texture is stored as a series of recursively filtered images with each image being one-quarter the size of the previous image. Each of the various images is referred to as a "mipmap level of detail" of the mipmap. While the highest level of detail may be of any size, it is shown as a 32×32 texel image 50 in FIG. 3. The less detailed images are a 16×16 image 52, an 8×8 image 54, a 4×4 image 56, a 2×2 image 58, and a 1×1 image 60.

The texture coordinate system is designated by U and V, and the mipmap level of detail being referred to is D with 0 (zero) being the 32×32 image 50, 1 (one) being the 16×16 image 52, 2 (two) being the 8×8 image 54, 3 (three) being the 4×4 image 56, 4 (four) being the 2×2 image 58, and 5 (five) being the 1×1 image 60. For each corresponding mipmap level of detail, D, four texels on an image are filtered to form one texel on the next smaller image. Thus, texel $(u_1, v_1)$ 62, texel $(u_2, v_2)$ 64, texel $(u_3, v_3)$ 70, and texel $(u_4, v_4)$ 68 on the 32×32 image 50 would be filtered to form the texel (u', v') 72 on the 16×16 image 52. Similarly, four texels on the 16×16 image 52 would be filtered to form a texel on the 8×8 image 54. This would be repeated to form the texels for the 2×2 image 58 and the 1×1 image 60.

Figure 4:
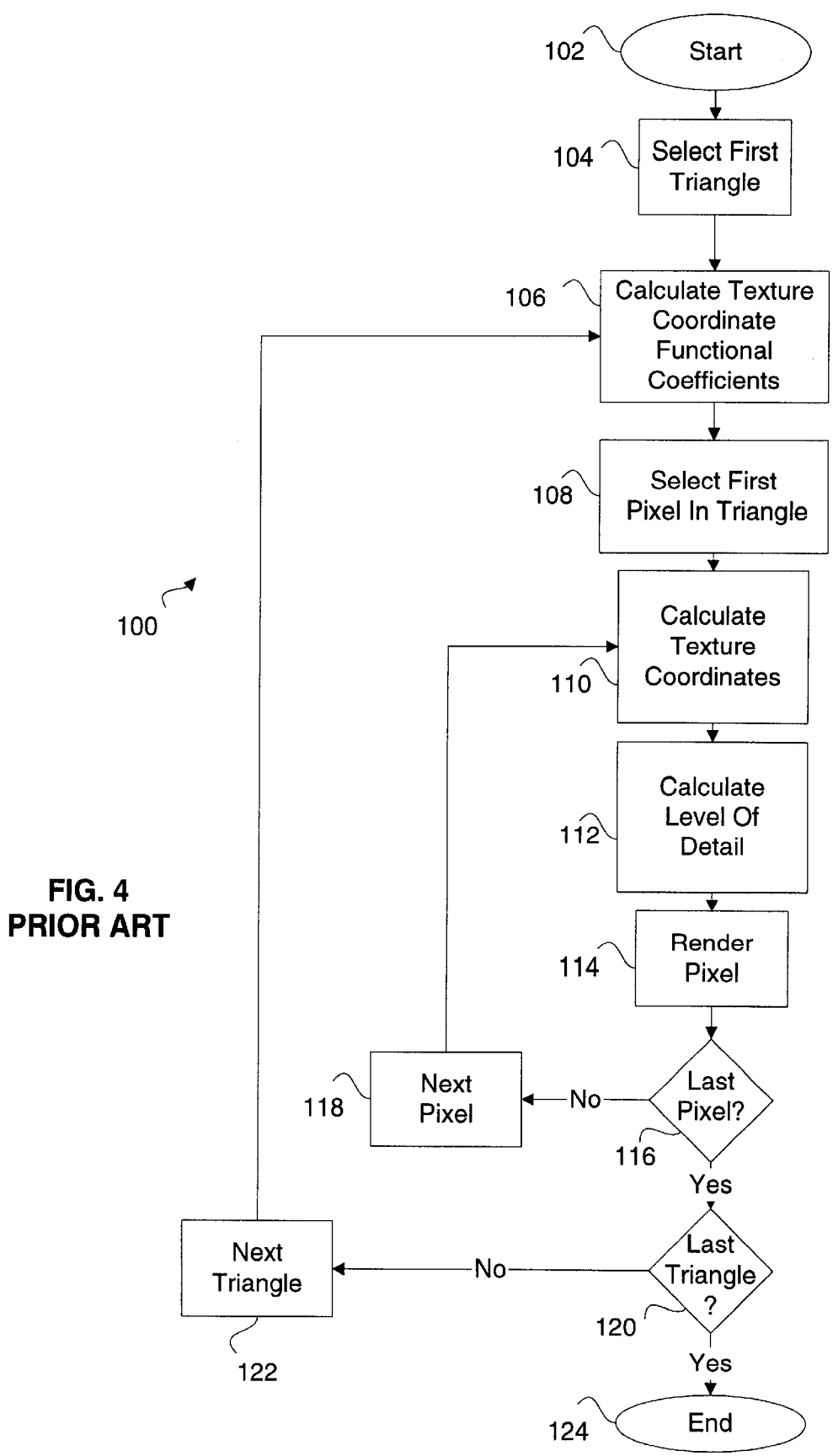
FIG. 4 (PRIOR ART) is a flowchart outlining the steps of a prior art technique for mipmap texturing.

Referring now to FIG. 4 (PRIOR ART), therein is shown a flowchart for the conventional technique for mipmapping a texture to a computer graphic object 28 on a display 16. The program 100 begins at start block 102. It proceeds to select the first triangle at block 104 and then proceeds to calculate texture coordinate functional coefficients at the vertices of the triangle in block 106. Next, the program proceeds to select the first pixel in the triangle with coordinates X, Y in block 108.

After calculation of the texture coordinate functional coefficients (see Equations 3–8) and the selection of the first pixel in the triangle with the X, Y coordinates, the texture coordinates U and V are calculated in block 110 using the X, Y, and previously determined texture coordinate functional coefficients.

The program 100 then proceeds to calculate the mipmap level of detail, D in block 112, from the texture coordinates, U and V, and the texture coordinate functional coefficients. Using the mipmap level of detail information, D, the pixel is rendered in block 114.

The program 100 then checks to determine whether the last pixel in the first triangle has been rendered in decision block 116. If it has not, the program goes to select the next pixel at block 118 and then returns to calculate the texture coordinates in block 110 for this next pixel.

If the last pixel has been rendered, there is a check to determine if the last triangle has been rendered. If it has not, the next triangle is selected at block 122 and the texture coordinate functional coefficients for this triangle are calculated at block 106.

When the entire object 28 has been rendered with the proper texture, the program ends at block 124.

Figure 5:
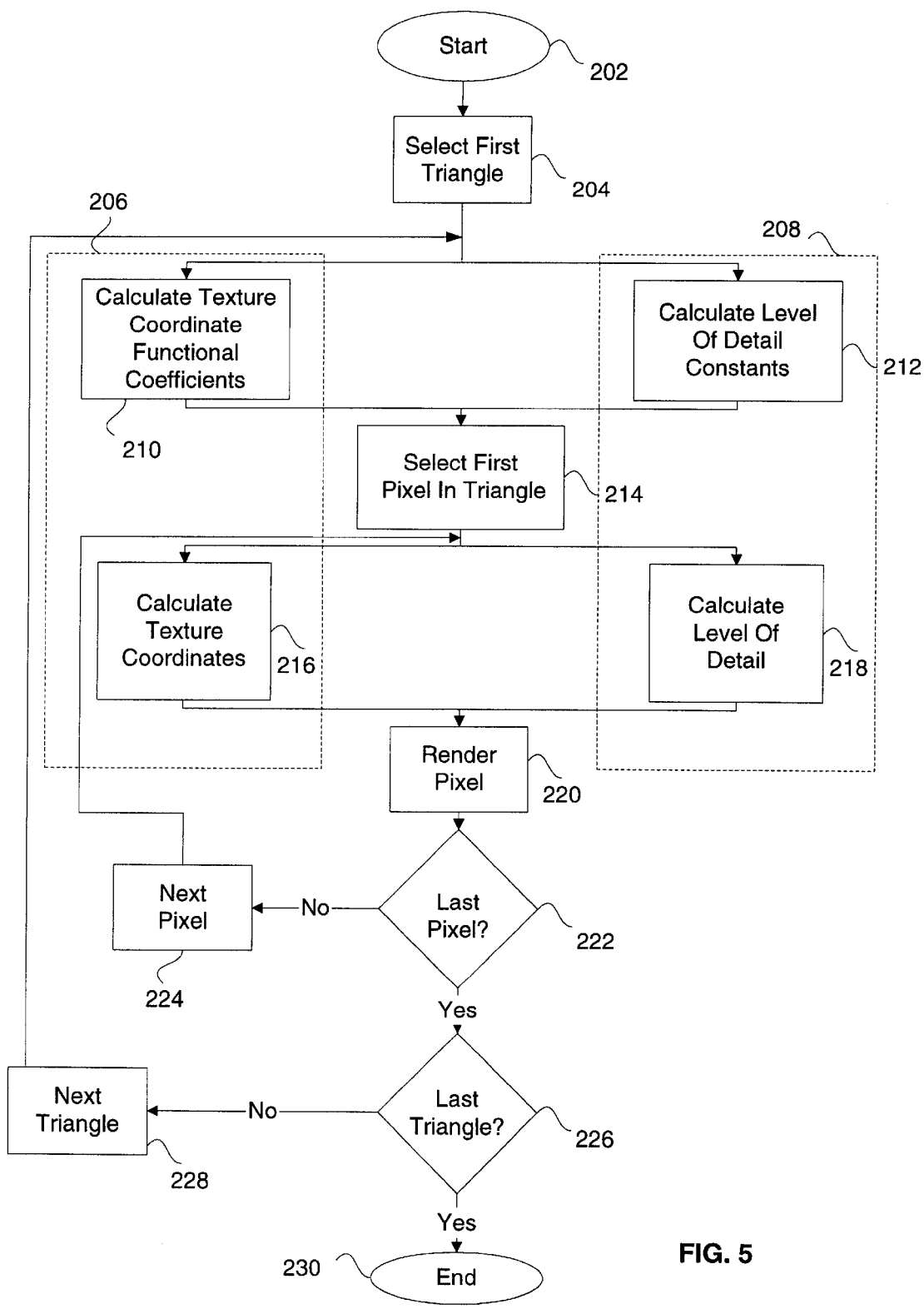
FIG. 5 is a flow chart outlining the steps of the technique of mipmap texturing of the present invention.

Referring now to the FIG. 5, therein is shown the program 200 of the present invention which begins at start block 202. The program 200 then proceeds to select the first triangle in block 204. After the first triangle is selected, the program branches to two parallel blocks, the texture coordinate determining branch 206 and the mipmap level of detail determining branch 208. In relation to FIG. 1, the texture coordinate determining subsystem 23 of FIG. 1 corresponds to the texture coordinate determining branch 206 of FIG. 5. Additionally, the mipmap level of detail determining subsystem 25 of FIG. 1 corresponds to the mipmap level of detail determining branch 208 of FIG. 5.

In the texture coordinate determining branch 206, the program calculates texture coordinate functional coefficients at a block 210. In parallel, the program 200 calculates the mipmap level of detail constants in a block 212.

After the various constants are calculated, the program proceeds to select the first pixel in the triangle with coordinates X, Y in a block 214. The program then branches back to the texture coordinate determining branch 206 and the mipmap level of detail determining branch 208. In the texture coordinate determining branch 206, the texture coordinate values are determined using X, Y, and the texture coordinate functional coefficients in a block 216. In parallel, the mipmap level of detail, D, is calculated from X, Y and the mipmap level of detail constants in a block 218.

The calculations of U, V, and D are passed to render the pixel at render pixel block 220.

After the particular textured pixel is rendered at block 220, a check is made at decision block 222 to determine if the last pixel has been rendered. If not, the program proceeds to the next pixel block 224 and thence to the calculation of texture coordinates U and V in block 216 and the calculation of the mipmap level of detail, D, at block 218.

When the last pixel has been rendered, as determined at decision block 222, the program proceeds to determine if the last triangle has been rendered at decision block 226. If the last triangle has not been rendered, the program proceeds to the next triangle block 228 and thence to the texture coordinate determining branch 206 and the mipmap level of detail determining branch 208. When the last triangle has been rendered, the program proceeds to end at block 230.

In operation as shown in FIG. 4 (PRIOR ART) with program 100, a first triangle would be selected at block 104 and then the texture coordinate functional coefficients would be calculated at block 106 using Equations 3–8 to solve for $a_i$, $b_i$, and $c_i$, where i=1, 2, 3 for each of the three vertices of a triangle, such as triangle 32. These constants define the relationship between the pixel coordinates in the display and the texture mapped coordinates for the triangle 32.

Next, a first pixel is selected in the triangle 32 in block 108, and then the texture coordinates U and V are calculated for the X, Y coordinate pixel using the texture coordinate functional coefficients and Equations 3–8 in block 110.

After the calculation of U and V, the program progresses to calculate the mipmap level of detail, D, in block 112. First, Equations 9–12 are used to determine the values required by Equation 2 to determine the mipmap level of detail, D. The mipmap level of detail, D, is determined by taking the base 2 logarithm which provides a characteristic (integer) portion of the logarithm to indicate the mipmap level and a mantissa (fractional) portion which can be used as a fractional mipmap level number to determine the amount of adjacent mipmap level blending to be performed.

Based on the above, the program progresses to the render pixel block 114 and renders the textured pixel on the output display 16.

The program 100 then checks at the decision block 116 to see if the last pixel in the triangle 32 has been rendered, and if not, will go to the block 118 to select the next pixel and start to calculate the U and V of the next pixel.

If the last pixel has been rendered, as indicated at the decision block 116, the program 100 will proceed to determine if the last triangle has been rendered at decision block 120. If there are other triangles remaining, such as triangles 34, etc., the program will proceed to select the next triangle at block 122 and begin the process of calculating the texture coordinate functional coefficients at block 106 for that triangle. Subsequently, the program 100 will proceed through a pixel by pixel calculation of U and V for each of the X, Y coordinates of the triangle. When the last triangle has been rendered, the decision block 120 will let the program proceed to the end block 124.

As will be evident with the prior art system, the texture coordinates and mipmap level of detail are computed sequentially.

In operation, the present invention as shown in FIG. 5, the program 200 starts at block 202 and selects the first triangle 32 at block 204. At the branch into the texture coordinate determining branch 206 and the mipmap level of detail determining branch 208, the texture coordinate determining branch 206 may be substantially the same as the texture coordinate determining routine of the program 100 in blocks 106, 108, and 110.

In the texture coordinate determining branch 206, the texture coordinate functional coefficients may be determined in block 210 using Equations 3–8 to solve for $a_i$, $b_i$, $c_i$.

The first pixel in the triangle 32 is selected at block 214 and then proceeds to block 216 where U and V are calculated using the X, Y coordinates of the first pixel, the texture coordinate functional coefficients, and Equations 3–8.

In parallel with the texture coordinate determination in the texture coordinate determining branch 206, the mipmap level of detail constants is determined in branch 208. The middle U among the U vertex values $U_1$, $U_2$, and $U_3$ is then determined. Using $U_2$, a linear interpolated V is obtained at edge $U_1$, $U_3$ with $U_2$ as the interception (and U being the interception). This gives the Equations 13–14.

$$r = \frac{(U_3 - U_2)}{(U_3 - U_1)}$$

$$V_{nu} = r*(V_1 + V_3) + V_3 \qquad \text{(Equations 13–14)}$$

Next $X_{nu}$, $Y_{nu}$, and $Z_{nu}$ are obtained with reverse-perspective ratio using the equations:

$$r = \frac{(U_3 - U_2)*Z_3}{((U_3 - U_2)*Z_3 + (U_2 - U_1)*Z_1)}$$

$$X_{nu} = r*(X_1 - X_3) + X_3$$

$$Y_{nu} = r*(Y_1 - Y_3) + Y_3$$

$$Z_{nu} = r*(Z_1 - Z_3) + Z_3$$

$$Z_{screen} \stackrel{det}{=} \tilde{W} \qquad \text{(Equations 15–19)}$$

The X and Y coordinates at the vanishing points, $X_{cu}$ and $Y_{cu}$, are determined along with $K_u$ (the U constant) by the equations:

if ($Z_2 \neq Z_{nu}$)

$$X_{cu} = \frac{(X_{nu}*Z_2 - X_2*Z_{nu})}{(Z_2 - Z_{nu})};$$

$$Y_{cu} = \frac{(Y_{nu}*Z_2 - Y_2*Z_{nu})}{(Z_2 - Z_{nu})};$$

$$K_u = \frac{(Z_2 - Z_{nu})}{((V_2 - V_{nu})*Z_2*Z_{nu})};$$

else $$X_{cu} = \frac{(X_{nu}*Z_2 - X_2*Z_{nu})}{((V_2 - V_{nu})*Z_2*Z_{nu})};$$

$$Y_{cu} = \frac{(Y_{nu}*Z_2 - Y_2*Z_{nu})}{((V_2 - V_{nu})*Z_2*Z_{nu})};$$

$K_u = 0;$ // special case  (Equations 20–25)

The V portion of the mipmap level of detail constants is determined by finding the middle V among $V_1$, $V_2$, $V_3$ as done for $U_1$, $U_2$, and $U_3$, such as $V_2$. Next, the linear interpolated U at edge $V_1$, $V_3$ with $V_2$ as the interception is determined by the equations:

$$r = \frac{(V_3 - V_2)}{(V_3 - V_1)};$$

$$U_{nv} = r*(U_1 - U_3) + U_3 \qquad \text{(Equations 26–27)}$$

Again, using, the reverse-perspective ratio, $X_{nv}$, $Y_{nv}$, and $Z_{nv}$ are determined according to the volume equations:

$$r = \frac{(V_3 - V_2)*Z_3}{((V_3 - V_2)*Z_3 + (V_2 - V_1)*Z_1)}$$

$$X_{nv} = r*(X_1 - X_3) + X_3$$

$$Y_{nv} = r*(Y_1 - Y_3) + Y_3$$

$$Z_{nv} = r*(Z_1 - Z_3) + Z_3 \qquad \text{(Equations 28–31)}$$

Next, the coordinates at the vanishing point $X_{cv}$, $Y_{cv}$, and $K_v$ (the V constant) are determined using the equations:

if($Z_2 \neq Z_{nv}$)

$$X_{cv} = \frac{(X_{nv}*Z_2 - X_2*Z_{nv})}{(Z_2 - Z_{nv})};$$

$$Y_{cv} = \frac{(Y_{nv}*Z_2 - Y_2*Z_{nv})}{(Z_2 - Z_{nv})};$$

$$K_v = \frac{(Z_2 - Z_{nv})}{((U_2 - U_{nv})*Z_2*Z_{nv})};$$

else $$X_{cv} = \frac{(X_{nv}*Z_2 - X_2*Z_{nv})}{((U_2 - U_{nv})*Z_2*Z_{nv})};$$

$$Y_{cv} = \frac{(Y_{nv}*Z_2 - Y_2*Z_{nv})}{((U_2 - U_{nv})*Z_2*Z_{nv})};$$

$K_v = 0;$ // special case  (Equations 32–37)

Next, one of the factors for the triangle scaling constant det_am$_2$ is determined using the equation:

$$\text{det\_am}_2 = -(U_2 - U_{nv})*(V_1 - V_3) \qquad \text{(Equation 38)}$$

The X portion is similarly found using the middle X among $X_1$, $X_2$, $X_3$, such as $X_2$ as done previously. The linear interpolated $Y_{ny}$ at edge $X_1$ and $X_2$ with $X_{ny}$ as the interception is determined by the equations:

$$r = \frac{(X_3 - X_2)}{(X_3 - X_1)}$$

$$Y_{ny} = r*(Y_1 - Y_3) + Y_3 \qquad \text{(Equations 39–40)}$$

Similarly, the Y portion is found by selecting the middle Y among $Y_1, Y_2, Y_3$, such as $Y_2$ so $Y_{nx}$ equals $Y_2$. And, the linear interpolated $X_{nx}$ at edge $Y_1$ and $Y_3$ with $Y_{nx}$ as the interception is determined by the equations:

$$r = \frac{(Y_3 - Y_2)}{(Y_3 - Y_1)}$$

$$X_{nx} = r*(X_1 - X_3) + X_3 \quad \text{(Equations 42)}$$

Another of the factors for the triangle scaling constant del_gm$_2$ is determined using the equation:

$$\det\_gm_2 = -(X_2 - X_{nx})*(Y_1 Y_3) \quad \text{(Equation 43)}$$

Using the above equations including Equations 38 and 43, the triangle scaling constant, C, is determined using the following equation:

$$C = \left(\frac{det\_am_2}{det\_gm_2}\right)*Z_1*Z_2*Z_3 \quad \text{(Equation 44)}$$

Next, the first pixel in the triangle is selected and the program goes to block 218 where the mipmap level of detail, D, is determined using the X, Y and mipmap level of detail constants in the equations:

normal case:

$$J = \frac{\begin{bmatrix} (y - Y_{cu})*K_u*C & (X_{cu} - x)*K_u*C \\ (Y_{cv} - y)*K_v*C & (x - X_{cv})*K_v*C \end{bmatrix}}{Z(x, y)^2}$$

special case when $K_u = 0$:

$$J = \begin{bmatrix} -Y_{cu}*C & X_{cu}*C \\ (Y_{cv} - y)*K_v*C & (x - X_{cv})*K_v*C \end{bmatrix} \Big/ Z(x, y)^2$$

special case when $K_v = 0$:

$$J = \begin{bmatrix} (y - Y_{cu})*K_u*C & (X_{cu} - x)*K_u*C \\ Y_{cv}*C & -X_{cv}*C \end{bmatrix} \Big/ Z(x, y)^2$$

special case when both $K_u = 0$ and $K_v = 0$:

$$J = \begin{bmatrix} -Y_{cu}*C & X_{cu}*C \\ Y_{cv}*C & -X_{cv}*C \end{bmatrix} \Big/ Z(x, y)^2 \quad \text{(Equations 45-48)}$$

where J represents the Jacobian, which is a determinant defined for a finite number of functions of the same number of variables in which each row consists of the first partial derivatives of the same function with respect to each of the variables.

By taking the log$_2$ of the Jacobian norm, the mipmap level of detail (D) is determined wherein the characteristic (integer) is the mipmap level of detail and the mantissa (fraction) is the blending required. Thus:

$$D = \log_2 \|J\|$$

The above equation provides two values of D which are:

$$D = \log_2 \left( \sqrt{\left(\frac{dU}{dX}\right)^2 + \left(\frac{dU}{dY}\right)^2} \right)$$

and $$D = \log_2 \left( \sqrt{\left(\frac{dV}{dX}\right)^2 + \left(\frac{dV}{dY}\right)^2} \right)$$

The larger of the above is used to render the pixel.

At this point the program 200 uses the texture coordinates and the mipmap level of detail for the pixel in the triangle and renders the textured pixel at block 220. The program then checks to see if the last pixel in the triangle 32 has been rendered at decision block 222 and if not, selects the next pixel at block 224 to make the calculations for the texture coordinates and mipmap level of detail in blocks 216 and 218, respectively.

If the last pixel has been rendered, the program will move to the decision block 226 to determine whether or not the last triangle has been rendered. If not, the program will proceed to select the next triangle at block 228 and will return to have the texture coordinate functional coefficients calculated for the next triangle 34 at block 210 and simultaneously the mipmap level of detail constants calculated at block 212. The first pixel in the next triangle will then be selected and the texture coordinates in block 216 and the mipmap level of detail in block 218 will be calculated in parallel to be able to render this pixel in block 220. If the last triangle has been selected, the program will end at block 230.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters set forth herein or shown in the accompanying drawings are to be interpreted in an illustrative and non-limiting sense.

The invention claimed is:

1. Apparatus for mipmapping a texture to a computer graphics object on a display for a graphics computer system, comprising:

polygon selection means for selecting a polygon from a plurality of polygons defining the object;

texture coordinate determining means connected to the polygon selection means for determining the texture coordinates of the polygon;

mipmap level determining means connected in parallel to the texture coordinate determining means for determining the mipmap level of detail of a mipmap appropriate for the polygon; and polygon rendering means connected to the texture coordinate determining means and the mipmap level determining means for rendering the textured polygon on the display.

2. The apparatus of claim 1, wherein the texture coordinate determining means further comprises a texture coordinate functional coefficient calculator means for providing texture coordinate functional coefficients of the polygon.

3. The apparatus of claim 1, wherein the mipmap level determining means further comprises a mipmap level calculator means for calculating mipmap level of detail constants of the mipmaps.

4. The apparatus of claim 1, further comprising a pixel selection means for selecting a pixel in the polygon.

5. The apparatus of claim 4, wherein the texture coordinate determining means further comprises a texture coordinate calculation means coupled to the pixel selection means to calculate the texture coordinates for the selected pixel.

6. The apparatus of claim 4, wherein the mipmap level determining means further comprises a mipmap level of detail calculation means coupled to the pixel selection means to calculate the mipmap level of detail for determining the mipmap to be used for rendering a textured pixel.

7. The apparatus of claim 1, further comprising a pixel rendering means for rendering a textured pixel.

8. The apparatus of claim 1, further comprising a next pixel selection means for selecting a next pixel in the polygon.

9. The apparatus of claim 1, further comprising a next polygon selection means for causing the polygon selection means to select a next polygon of the object.

10. The apparatus of claim 1, wherein the polygon selection means is a triangle selection means.

11. A method for mipmapping a texture to a computer graphics object on a display for a graphics computer system, comprising the steps of:

selecting a polygon from a plurality of polygons defining the object;

determining the texture coordinates of said polygon;

determining the mipmap level of detail of a mipmap appropriate for said polygon in parallel with said determining of the texture coordinates; and rendering said textured polygon on the display.

12. The method of claim 11, further comprising the steps of selecting a next pixel in the polygon and selecting a next polygon of the object.

13. The method of claim 11, wherein the step of determining the texture coordinates further comprises the step of calculating texture coordinate functional coefficients of the polygon.

14. The method of claim 11, wherein the step of determining the mipmap level of detail further comprises the step of calculating mipmap level of detail constants of the mipmaps.

15. The method of claim 11, further comprising the step of selecting a pixel in the polygon.

16. The method of claim 15, wherein the step of determining the texture coordinates further comprises the step of calculating texture coordinates for the selected pixel.

17. The method of claim 15, wherein the step of determining the mipmap level of detail further comprises the step of calculating the mipmap level of detail for determining the mipmap level to be used for rendering a textured pixel.

18. The method of claim 11, further comprising the step of rendering a textured pixel.

19. The method of claim 11, wherein the step of selecting a polygon further comprises the step of selecting a triangle.

20. A method for mipmapping a texture to a computer graphics object on a display for a graphics computer system, comprising the steps of:

selecting a triangle from a plurality of triangles defining the object;

determining texture coordinates of the triangle;

determining a mipmap level of detail of a mipmap using a Jacobian norm; and rendering the textured triangle on the display.

21. The method of claim 20, further comprising the steps of calculating texture coordinate functional coefficients of the triangle and mipmap level of detail constants of the mipmaps.

22. The method of claim 21, further comprising the steps of selecting a pixel in the triangle and using the selected pixel in the triangle and the texture coordinate functional coefficients to calculate the texture coordinates (U, V, and W) for the triangle.

23. A method for mipmapping a texture to a computer graphics object on a display for a graphics computer system, comprising the steps of:

selecting a triangle from a plurality of triangles defining the object;

determining texture coordinates of the triangle;

determining a mipmap level of detail of a mipmap using a Jacobian norm;

rendering the textured triangle on the display;

calculating texture coordinate functional coefficients of the triangle;

calculating mipmap level of detail constants of the mipmaps;

selecting a pixel in the triangle;

using the selected pixel in the triangle and the texture coordinate functional coefficients to calculate the texture coordinates (U, V, and W) for the triangle; and using the triangle coordinates (X, Y, and Z) and the mipmap level of detail constants ($a_i$, $b_i$, and $c_i$, where i=1,2,3):

$$\tilde{U}=a_1*X+b_1*Y+c_1$$

$$\tilde{V}=a_2*X+b_2*Y+c_2$$

$$\tilde{W}=a_3*X+b_3*Y+c_3$$

$$U = \frac{\tilde{U}}{\tilde{W}}$$

$$V = \frac{\tilde{V}}{\tilde{W}}$$

$$\tilde{W}^{det}=Z_{screen}$$

to calculate the mipmap level of detail (D) using:

normal case:

$$J = \frac{\begin{bmatrix} (y-Y_{cu})*K_u*C & (X_{cu}-x)*K_u*C \\ (Y_{cv}-y)*K_v*C & (x-X_{cv})*K_v*C \end{bmatrix}}{Z(x,y)^2}$$

special case when $K_u=0$:

$$J = \begin{bmatrix} -Y_{cu}*C & X_{cu}*C \\ (Y_{cv}-y)*K_v*C & (x-X_{cv})*K_v*C \end{bmatrix} \Big/ Z(x,y)^2$$

special case when $K_v=0$:

$$J = \begin{bmatrix} (y-Y_{cu})*K_u*C & (X_{cu}-x)*K_u*C \\ Y_{cv}*C & -X_{cv}*C \end{bmatrix} \Big/ Z(x,y)^2$$

special case when both $K_u=0$ and $K_v=0$ $$J = \begin{bmatrix} -Y_{cu} * C & X_{cu} * C \\ Y_{cv} * C & -X_{cv} * C \end{bmatrix} \bigg/ Z(x,y)^2$$

where:

$K_v$ is a texture coordinate constant, and

C is a triangle sealing constant;

and $D = \log_2 \|J\|$ for determining the mipmap to be used for rendering a textured pixel.

24. The method as claimed in claim 23 including the steps of: selecting a further pixel in said triangle after rendering said textured pixel; and selecting a further triangle of the object after rendering said triangle.

25. The method of claim 23, further comprising the step of rendering the textured pixel.

* * * * *